United States Patent [19]

Gregg et al.

[11] 3,928,821

[45] Dec. 23, 1975

[54] HIGH ENERGY CHEMICAL LASER SYSTEM

[75] Inventors: David W. Gregg, Lafayette; Richard K. Pearson, Pleasanton, both of Calif.

[73] Assignee: The United States of America as represented by the United States Energy Research and Development Administration, Washington, D.C.

[22] Filed: Jan. 23, 1975

[21] Appl. No.: 543,611

Related U.S. Application Data

[63] Continuation of Ser. No. 146,948, May 26, 1971, abandoned.

[52] U.S. Cl. .......................................... 331/94.5 G
[51] Int. Cl.² .......................................... H01S 3/22
[58] Field of Search ................................... 331/94.5

Primary Examiner—William L. Sikes
Attorney, Agent, or Firm—Dean E. Carlson; F. A. Robertson; L. E. Carnahan

[57] ABSTRACT

A high energy chemical laser system wherein explosive gaseous mixtures of a reducing agent providing hydrogen isotopes and interhalogen compounds are uniformly ignited by means of an electrical discharge, flash-photolysis or an electron beam. The resulting chemical explosion pumps a lasing chemical species, hydrogen fluoride or deuterium fluoride which is formed in the chemical reaction. The generated lasing pulse has light frequencies in the 3-micron range. Suitable interhalogen compounds include bromine trifluoride ($BrF_3$), bromine pentafluoride ($BrF_5$), chlorine monofluoride ($ClF$), chlorine trifluoride ($ClF_3$), chlorine pentafluoride ($ClF_5$), iodine pentafluoride ($IF_5$), and iodine heptafluoride ($IF_7$); and suitable reducing agents include hydrogen ($H_2$), hydrocarbons such as methane ($CH_4$), deuterium ($D_2$), and diborane ($B_2H_6$), as well as combinations of the gaseous compound and/or molecular mixtures of the reducing agent.

6 Claims, 3 Drawing Figures

INVENTORS
DAVID W. GREGG
RICHARD K. PEARSON

ATTORNEY:

INVENTORS
DAVID W. GREGG
BY RICHARD K. PEARSON

ATTORNEY:

HIGH ENERGY CHEMICAL LASER SYSTEM

This is a continuation of application Ser. No. 146,948, filed May 26, 1971, now abandoned.

BACKGROUND OF THE INVENTION

The invention described herein was made in the course of, or under, Contract No. W-7405-ENG-48 with the United States Atomic Energy Commission.

This invention relates to explosive gas laser systems, and more particularly to such a laser system which utilizes explosive gaseous mixtures of a reducing agent providing hydrogen fluoride or deuterium fluoride and interhalogen compounds uniformly ignited.

High power pulsed lasing systems which utilize an exothermic chemical reaction which has a lasing reaction species or product, which releases energy suitable for pumping that lasing species at a sufficient rate to generate an extremely large population inversion, and which can be uniformly and controllably initiated have been disclosed and claimed in U.S. patent application Ser. No. 40,653, filed May 26, 1970, issued as U.S. Pat. No. 3,623,145 on Nov. 23, 1971 by the inventors of this application and assigned to the same assignee.

SUMMARY OF THE INVENTION

The present invention is similar to the above referenced high power pulsed lasing system, but differs in that the present inventive system uniformly initiates the chemical reaction of gaseous mixtures of hydrogen isotopes and interhalogen compounds throughout the lasing cavity volume. This is accomplished as illustrated by an electrical discharge apparatus or an electron beam apparatus, but may also be carried out at least in some instances by flash-photolysis.

Therefore, it is an object of this invention to provide a high energy chemical laser system which utilizes an explosive gaseous mixture of a reducing agent and interhalogen compounds.

Another object of the invention is to provide a high energy, pulsed chemical laser system which utilizes an explosive gaseous mixture which releases energy suitable for pumping a lasing reaction species at a sufficient rate to generate an extremely large population inversion and which can be uniformly and controllably initiated.

Another object of the invention is to provide a high energy, pulsed chemical laser system which utilizes the reaction of hydrogen isotopes and interhalogen compounds.

Another object of the invention is to provide an electron discharge ignited high power, pulsed chemical laser utilizing an explosive gaseous mixture of hydrogen isotopes and interhalogen compounds.

Another object of the invention is to provide a capacitive controlled electron beam ignited high power, pulsed chemical laser utilizing an explosive gaseous mixture of hydrogen isotopes and interhalogen compounds.

Other objects of the invention will become readily apparent to those skilled in the art in view of the following description and accompanying drawings.

DESCRIPTION OF THE INVENTION

Figure 1:
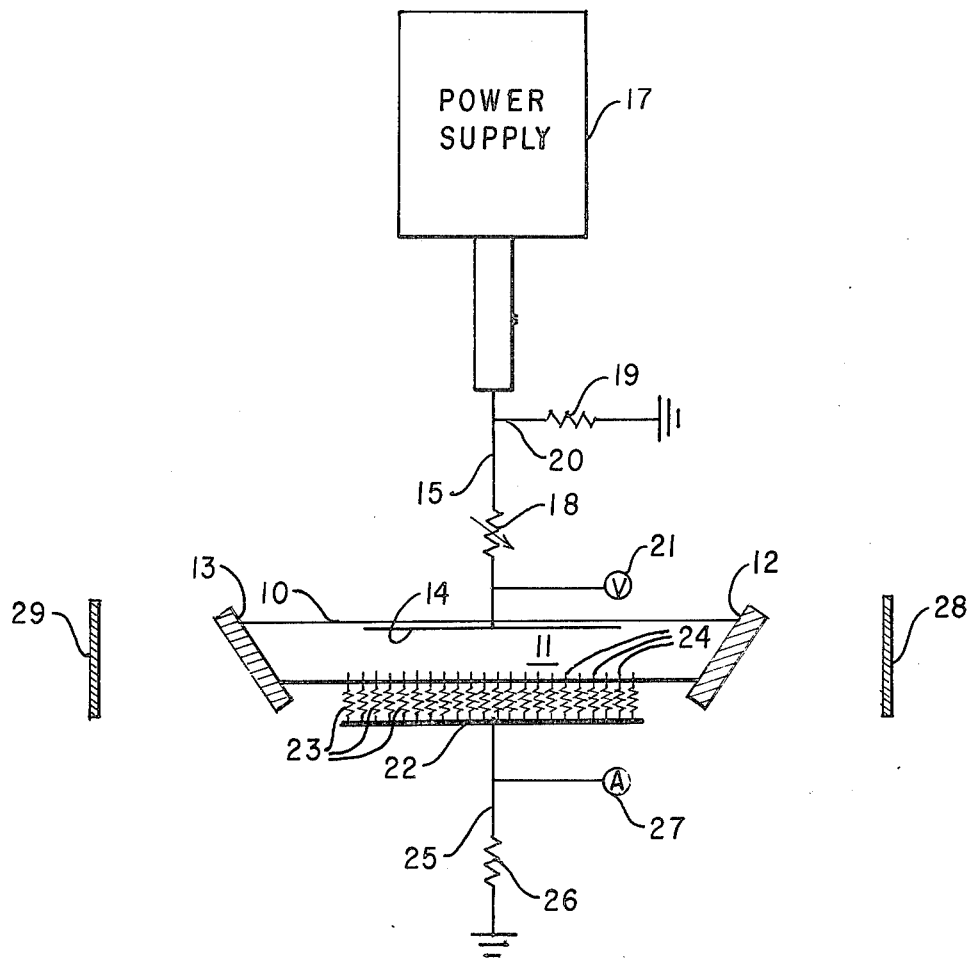
FIG. 1 is a schematic view of an electrical discharge apparatus for carrying out the invention.

This invention, like the above-referenced copending U.S. patent application is based on an exothermic chemical reaction which has a lasing reaction species or product, which releases energy suitable for pumping that lasing species at a sufficient rate to generate an extremely large population inversion, and which can be uniformly and controllably initiated for high power pulsed lasing systems. This reaction is provided by an explosive gaseous mixture of a reducing agent providing hydrogen isotopes (hydrogen and deuterium) and interhalogen compounds uniformly ignited by means of electrical discharge, electron beam, or in some instances flash-photolysis. The generated lasing pulse has light frequencies in the 3-micron range. Suitable interhalogen gaseous compounds include bromine trifluoride ($BrF_3$), bromine pentafluoride ($BrF_5$), chlorine monofluoride ($ClF$), chlorine trifluoride ($ClF_3$), chlorine pentafluoride ($ClF_5$), iodine pentafluoride ($IF_5$), and iodine heptafluoride ($IF_7$), while suitable reducing agents are hydrogen ($H_2$), deuterium ($D_2$), methane ($CH_4$), and diborane ($B_2H_6$) or the deuterated version, or combination thereof. It should be noted, that from the tests thus far conducted, that while these compounds have been found to lase by electrical discharge and electron beam initiation, at least certain of them, as discussed hereinafter, have lased by flash-photolysis ignition. However, the tests have not been completed at this time and thus are not conclusive.

Specifically it has been discovered that the following explosive gaseous mixtures will provide the desired chemical reaction described above: $BrF_3 + H_2$, $BrF_5 + H_2$, $ClF + H_2$, $ClF_3 + H_2$, $ClF_3 + B_2H_6$, $ClF_5 + H_2$, $IF_5 + H_2$, $IF_7 + H_2$, $IF_7 + D_2$, $IF_7 + CH_4$ and $IF_7 + B_2H_6$. Currently, it has been determined that the above mixtures will lase when initiated by the electrical discharge technique described hereinafter with respect of FIG. 1 of the drawings; and that from test thus far conducted at least the $IF_5 + H_2$, $IF_7 + H_2$ and $IF_7 + D_2$ mixtures will lase when initiated by the flash-photolysis (flashlamps) technique illustrated in FIG. 1 of the above referenced copending U.S. patent application. While each of the mixtures has not been tested at this time by flash-photolysis it appears that each will lase by this technique. While the electron beam technique, illustrated in FIG. 2 has not yet been utilized on each of the mixtures, there is no indication that each mixture will not lase by this technique since tests have generally shown that whenever lasing is attained by electrical discharge it has also been accomplished by the electron beam technique.

Inasmuch as the electrical discharge (see FIG. 1) testing to verify the invention concept has been directed more extensively to the mixture of iodine heptafluoride and molecular hydrogen ($IF_7 + H_2$), the following is set forth to illustrate the invention utilizing this technique: Laser action was achieved by the electrical discharge apparatus of FIG. 1 which initiated $IF_7 + H_2$ mixtures in the range of 2-9 parts $IF_7$ to 1 part $H_2$ at pressures ranging from 0 to 250 torr; the laser emission, in the region of about 2.7 to 3.1 microns, is attributed to hydrogen fluoride (HF), a product of combustion.

Mixtures of $IF_7 + H_2$ at pressures ranging from 10 to 50 torr lased on 11 vibrational-rotational lines of HF when subjected to electrical discharge. This system provides an intense laser, requires a relatively small amount of energy for initiation, burns to completion, and has all gaseous products.

The electrical discharge apparatus utilized in the $IF_7 + H_2$ tests described above is schematically illustrated in FIG. 1 and comprises a laser tube or vessel 10, having an active volume, for example, 50 cm long by 1.0 cm diameter, filled with an explosive gaseous mixture 11, such as $IF_7 + H_2$. The laser tube 10 containing the explosive mixture 11 is provided at each end thereof with windows 12 and 13 oppositely positioned at Brewster's angle and constructed, for example, from barium fluoride ($BaF_2$). An electrode 14 is positioned within laser tube 10 and connected by lead 15 to a capacitor type power supply 17 capable of supplying a short, high energy electric pulse, such as a Fexitron manufactured by Field Emission Corporation of McMinnville, Oregon. Positioned in lead 15 is a variable resistor 18, while a load resistor 19 is connected by a lead 20 between lead 15 and ground. A voltage probe indicated at 21 is connected to lead 15 intermediate variable resistor 18 and laser tube 10. Variable resistor 18, for example, may vary from 0 to 235 ohms while load resistor 19 is 83 ohms. A bus bar or electrode 22 is positioned externally of laser tube 10 and on the opposite side thereof and is connected through a plurality of resistors 23 to a plurality of conductive wires 24 which extend into tube 10 in sealed relationship therewith, resistors 23, there being 51 such resistors in the actual test device, but only seventeen are shown in the illustrated embodiment for clarity, each of the resistors 23 being of the 1 K ohms type, for example. Electrode 22 is connected through a lead 25 to ground with a resistor 26, of 0.3 ohms for example, positioned in lead 25. A current probe indicated at 27 is connected to lead 25 intermediate electrode 22 and resistor 26. A pair of mirrors 28 and 29 are positioned at opposite ends of laser tube 10 at selected spaced locations and define the laser cavity with the light beam indicated at 22 being brought out through mirror 28 which is only partially reflective while mirror 29 is over 99% reflective. The mirrors may for example be concave and of a 10 meter-radius, gold-coated and spaced 60 cm apart. In the tests conducted on the $IF_7 + H_2$ mixture, the laser output was detected using a monochrometer Ge(Au) detector at 77°K.

Figure 2:
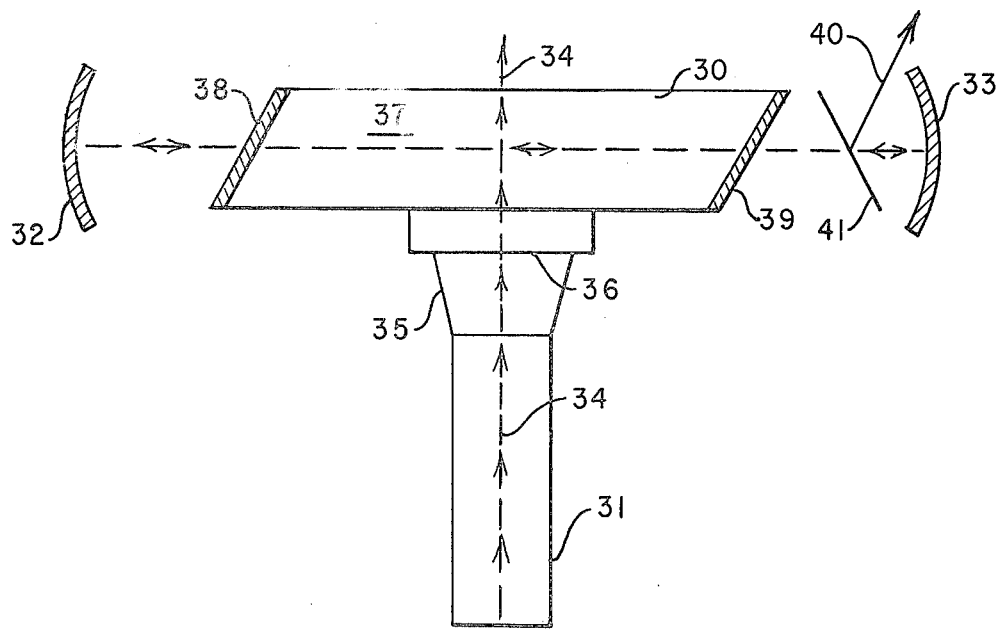
FIG. 2 is a schematic illustration of an electron beam apparatus for carrying out the invention.

Testing to verify the inventive concept utilizing the electron beam-initiated technique, utilizing the FIG. 2 apparatus, has also been more extensively directed to the mixture of $IF_7 + H_2$ and the following is set forth to illustrate the invention utilizing this technique. Laser action was achieved in mixtures in the ratio of 3 to 8.5 parts $IF_7 + H_2$ to 1 part $H_2$ at pressures ranging from 10 to 300 torr using a 1.2 MeV, 50 ns (nanosecond) pulsed beam of electrons to volumetrically initiate the chemical reaction. The laser emission, in the region of about 2.7 to 3.1 microns is attributed to hydrogen fluoride (HF), a product of combustion.

Mixtures of $IF_7 + H_2$ at pressures ranging from 10 to 250 torr were found to lase on vibrational-rotational lines of HF, when subjected to a 50 ns pulse of 1.2 MeV electrons containing nominally 350 joules per pulse. This results in approximately 40 joules/gm deposited directly in the gas mixture. Thus, as described in the above-mentioned patent application, the use of a beam of relativistic electrons, from the electron beam generator to initiate chemical lasers represents an entirely new form of "flashphotolysis" which has features distinctly different from flashlamps when used for the volumetric ignition of chemical lasers. By using the electron beam initiation technique, large amounts of useful ignition energy are obtainable in short times compared to flashlamp systems. The apparatus used in the above testing is capable of delivering 500 joules in 50 ns, but still larger apparatus capable of delivering more energy in less time is within the present state of the art. Pulsed electron beam apparatus have the ability to penetrate large amounts of material with uniform energy deposition relative to flashlamp light. The apparatus used in the above tests, which produces 1.2 MeV electrons can penetrate approximately 1 gm/cm$^2$ of material with an energy deposition profile that is significantly more uniform than the normal exponential loss profile expected with light. Also this energy deposition profile and the total penetration can be controlled to some extent by controlling the energy of the electrons. Electron beam apparatus can also initiate reactions that are not initiatable by flashlamps or electrical discharge techniques since they will dissociate molecules that absorb far in the ultra-violet beyond the transmission band of flashlamp envelopes.

The electron beam-initiated apparatus used in the $IF_7 + H_2$ tests described above is schematically illustrated in FIG. 2 and basically comprises a laser tube or vessel 30, having, for example, a 2 cm diameter and a 4 cm length and constructed of material, such as metal foil, transparent to the electron beam; a pulsed electron beam generator 31, such as an accelerator; and a pair of concave mirrors 32 and 33. An electron beam indicated at 34, generated by generator 31, is illustrated as being perpendicular to the longitudinal axis of laser tube 30 as a matter of convenience but is not required to be perpendicular to the tube 30, and is connected with laser tube 30 via a conventional beam manipulation or dispersion device 35 through a foil window 36 mounted on the side of laser tube 30. Window 36, for example, may be constructed of 0.001 inches aluminum foil. The laser tube 30 is filled with an explosive gaseous mixture 37, such as $IF_7 + H_2$. The laser tube 30 is provided at each end thereof with windows 38 and 39, positioned at the Brewster angle and constructed, for example, from $BaF_2$. Mirrors 32 and 33 are positioned in spaced relationship with respect to windows 38 and 39, and define, along with the laser tube 30 and windows 38 and 39, the lasing cavity. For example, the concave mirrors 32 and 33 may be spaced 20 cm apart, with a 10 m radius of curvature, and vapor coated with gold. The output beam, indicated at 40 is obtained by placing a beam splitter 41 inside the laser cavity as shown, beam splitter 41 being made, for example, from NaCl. While only the output beam 40 is being considered in this instance, it is recognized that another output beam will be directed from beam splitter 41 in generally the opposite direction from that of beam 40. In the above described tests, an analysis of the laser output was made using a Ge(Au) detector at 77°K and an infrared (IR) monochrometer, the signal from the detector being measured with an oscilloscope, such as a Tektronix 519, none of which constitute part of the present invention and thus not shown.

Figure 3:
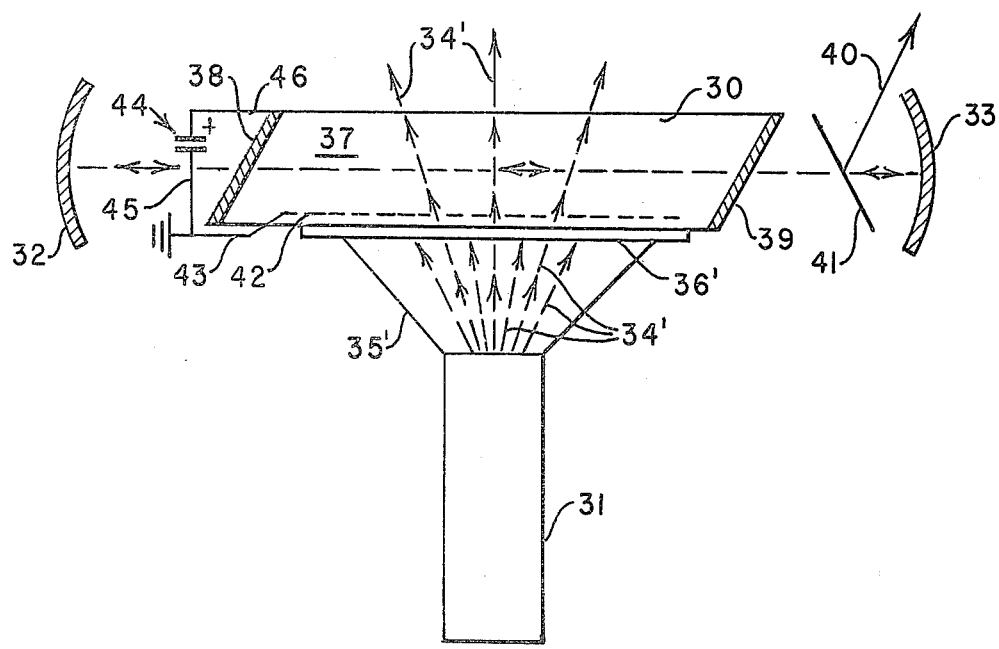
FIG. 3 is a schematic view of a modified electron beam apparatus for carrying out the invention.

The FIG. 3 embodiment is generally similar to FIG. 2 as described above and the same elements have been given corresponding reference numerals. The FIG. 3 embodiment differs basically from the FIG. 2 embodiment by the provision of a capacitor across the lasing tube and a grid positioned within the tube which provides additional advantages as set forth hereinafter. The FIG. 3 embodiment provides significant advantages for large electron beam-initiated laser systems.

As shown in FIG. 3, the improved electron beam apparatus basically comprises a laser tube or vessel 30 constructed of material transparent to the electron beam; a pulsed electron beam generator 31, such as an accelerator; and a pair of concave mirrors 32 and 33. An electron beam, indicated by the arrows 34' generated by generator 31 directed into laser tube 30 via a beam manipulation or dispersion device 35' through a window 36' mounted on the side of laser tube 30, window 36' being constructed, for example, of aluminum foil. The laser tube 30 is filled with an explosive mixture 37, such as $IF_7 + H_2$ and is provided at each end thereof with windows 38 and 39, positioned at the Brewster angle and constructed, for example, from $BaF_2$. Mirrors 32 and 33 are positioned in selected spaced relationship with windows 38 and 39 and define, along with laser tube 30 and windows 38 and 39, the lasing cavity. An output beam, indicated at 40, is obtained by placing a beam splitter 41 inside the laser cavity as shown, beams splitter 41 functioning and being made, for example, as described above respecting the FIG. 2 embodiment. An electric grid 42 is operatively secured within laser tube 30 at the area thereof adjacent window 36'. Grid 42 is connected by a lead 43 which sealingly extends outwardly through laser tube 30 and is connected to ground as indicated. A capacitor 44 is connected via leads 45 and 46, respectively, to lead 43 and laser tube 30 at the side thereof opposite grid 42, thus forming an electrode opposite the grid, lead 46 being maintained at a positive potential as indicated by conventional means not shown. By way of example only, the generator 31 may be at about a negative 200 KV and the positive side of capacitor 44 at about a positive 100 KV. It is, of course, understood that the elements 43–46 would be positioned so as not to interfer with the beam reflection of mirror 32. Also it is understood that the term light as utilized herein includes the infrared region.

The capacitor (voltage) across the lasing tube serves two functions:

1. In large laser systems the electron beam utilized alone will loose a significant amount of its energy in traversing the lasing media. However, if a capacitor and thus an electric field of sufficient magnitude is applied properly across the lasing media, it will compensate for the energy loss in the electron beam. This will result in an unlimited range of the electrons, and most important, an extremely uniform desposition of energy throughout a large lasing volume.

2. The electric field will also serve as a control on the energy of the secondary electrons created by the electron beam. This could conceivably be used to adjust the energy of the secondary electrons to match with resonant excitation or decomposition processes for different molecular species.

With the $IF_7 + H_2$ mixture, lasing has been obtained from the use of a trace of hydrogen up to a 4-to-1 mixture ratio of $H_2$ to $IF_7$. While it has not yet been determined, it is currently believed that the timewidth (FWHM) and peak power of the generated pulse may depend on the mixture ratio of $H_2$ to $IF_7$.

It is hypothesized that the rise time of the generated pulse is inversely related to the pressure of the gaseous mixture, on the theory that a chemical reaction rate is proportional to collision rate of the reactant particles. The collision rate increases as pressure increases. Accordingly, the reaction rate would also increase. Recalling that the reaction rate determines the rise time of the generated laser pulse, it has been shown in testing the $IF_7 + H_2$ mixture that increasing the initial gas pressure from 5 torr to 10 torr significantly decreased the rise time of the generated laser pulse (from 200 ns to 100 ns). Accordingly, at least initial evidence indicates the above hypothesis is correct.

Again, it is pointed out that while the testing of the inventive concept, thus far conducted, has been more extensively directed to the $IF_7 + H_2$ mixture, $BrF_3 + H_2$, $BrF_5 + H_2$, $ClF + H_2$, $ClF_3 + H_2$, $ClF_3 + B_2H_6$, $ClF_5 + H_2$, $IF_5 + H_2$, $IF_7 + D_2$, $IF_7 + CH_4$, and $IF_7 + B_2H_6$ will lase by either the electrical discharge or electron beam technique illustrated in FIGS. 1 and 2, respectively. In addition at least mixtures of $IF_5 + H_2$, $IF_7 + H_2$ and $IF_7 + D_2$ will lase when initiated by the flashlamp apparatus of the type illustrated in FIG. 1 of the above referenced copending patent application.

It should be noted that it is within the scope of this invention to utilize combinations of the gaseous compounds, and it has been determined that lasing action will occur, at least with the electron beam and electrical discharge techniques, with any combinations or proportions of the above referenced gaseous compounds and reducing agents. Therefore, it is not intended to limit this invention to the use of any specific one of the compounds and reducing agents described above.

Also, while the pressures utilized in test thus far conducted have not exceeded 300 torr, this value is not a limitation on the pressures available with either of the electric discharge or electron beam techniques, and from preliminary information now available, it appears that the pressure may be considerably higher, quite probably nearing ambient pressure. Thus the examples herein set forth are not intended to be an upper limit of the pressure.

The inventive concept clearly advances the state of the chemical laser art by providing a reaction that is believed to be a branching chain explosive reaction which requires no energy investment above that necessary for initiating the reaction. The chemical reaction also releases energy suitable for pumping a lasing species of the reaction at a sufficient rate to generate an extremely large population inversion. The reaction has additional distinguishing features in that the reaction progresses to completion and the reaction products are gaseous. In addition, the reaction can be uniformly and controllably initiated, and thus suitable for a high power pulsed lasing system.

It is thus seen that the present invention utilizes explosive gaseous mixtures of a reducing agent providing hydrogen isotopes and inter-halogen compounds which can be initiated by flash photolysis, electron beam and-/or electrical discharge techniques.

Although particular embodiments of the invention have been illustrated and described, modifications and changes will become apparent to those skilled in the art, and it is intended to cover in the appended claims, all such modifications and changes as come within the spirit and scope of the invention.

What we claim is

1. A high energy chemical laser system capable of generating a lasing pulse having light frequencies in the 3-micron range comprising: means defining an optical cavity; and explosive gaseous mixture including a reducing agent providing reactive hydrogen isotope species and interhalogen compounds within said cavity, said explosive gaseous mixture consisting essentially of a reducing agent selected from the group consisting of $H_2$, $D_2$, $CH_4$, and $B_2H_6$, and an interhalogen compound selected from the group consisting of $BrF_3$, $BrF_5$, $ClF$, $ClF_3$, $ClF_5$, $IF_5$, and $IF_7$, said mixture being in a ratio in the range of about 2–9 parts interhalogen compound to 1 part reducing agent and at a pressure ranging from about 10 to 300 torr; and means for uniformly igniting said gaseous mixture, said igniting means producing a 50 nanosecond pulse of electrons through said gaseous mixture producing an exothermic chemical reaction yielding a lasing reaction species which releases energy for pumping that lasing species at a sufficient rate to generate an extremely large population inversion generating a lasing pulse having light frequencies in the range from about 2.7 to 3.1 microns.

2. The laser system defined in claim 1, wherein said explosive gaseous mixture is selected from the group consisting of $BrF_3+H_2$, $BrF_5+H_2$, $ClF+H_2$, $ClF_3+H_2$, $ClF_3+B_2H_6$, $ClF_5+H_2$, $IF_5+H_2$, $IF_7+H_2$, $IF_7+D_2$, $IF_7+CH_4$, and $IF_7+B_2H_6$.

3. The laser system defined in claim 1, wherein said means defining an optical cavity includes capacitor means positioned thereacross, and wherein said igniting means comprises an electron beam generating means.

4. The laser system defined in claim 1, wherein said igniting means comprises an electron beam generating means.

5. The laser system defined in claim 1, wherein said optical cavity defining means includes a vessel within which said explosive gaseous mixture is located, said vessel including at least oppositely positioned window means transparent to light, and mirror means positioned in spaced relationship with respect to said light transparent window means.

6. The laser system defined in claim 1, wherein said means defining an optical cavity includes a vessel means containing said explosive gaseous mixture, said vessel means being provided with an electrical grid means therein and a capacitor means connected thereacross.

* * * * *